United States Patent [19]

Shirasaki

[11] Patent Number: 4,983,433

[45] Date of Patent: Jan. 8, 1991

[54] FIBER REINFORCED PLASTIC AND ITS REINFORCEMENT

[75] Inventor: Yoshikazu Shirasaki, Otsu, Japan

[73] Assignee: Toyo Boseki Kabushiki Kaisha, Osaka, Japan

[21] Appl. No.: 457,156

[22] Filed: Dec. 26, 1989

[30] Foreign Application Priority Data

Dec. 26, 1988 [JP] Japan .................. 63-330024

[51] Int. Cl.$^5$ .............................. B32B 1/08
[52] U.S. Cl. .................. 422/36.1; 428/245; 428/253; 428/254; 428/257; 428/258; 428/259; 428/297; 428/298; 428/408; 428/413; 428/36.5
[58] Field of Search .............. 428/245, 253, 254, 257, 428/258, 259, 297, 298, 413, 408, 36.1, 36.5

[56] References Cited

U.S. PATENT DOCUMENTS

| 4,536,438 | 8/1985 | Bishop et al. | 428/257 |
| 4,801,491 | 1/1989 | Tanaka et al. | 428/259 |
| 4,857,379 | 8/1989 | Plöntges et al. | 428/257 |

Primary Examiner—James J. Bell
Attorney, Agent, or Firm—Wegner, Cantor, Mueller & Player

[57] ABSTRACT

A reinforcement for a fiber reinforced plastic which is a mixed-woven or knitted fabric of two kinds of filaments is disclosed. One kind of filament thereof is an ultra high molecular weight polyethylene filament having tensile strength of not less than 20 g/denier and tensile modulus of not less than 500 g/denier and the ultra high molecular weight polyethylene filament material occupies 60 to 90% of the total surface area of said fabric. The filament other than the ultra high molecular weight polyethylene filament occupies 60 to 90% of the total back surface area of the fabric. There is also disclosed a fiber reinforced plastic comprising a first reinforced resin layer reinforced with the above reinforcement and a matrix resin, and a second reinforced resin layer reinforced with an inorganic fiber and a matrix resin, the first reinforced resin layer being laminated on at least one surface of the second reinforced resin layer in such a manner that the back surface of the first reinforced resin layer faces to the second reinforced resin layer.

7 Claims, 2 Drawing Sheets

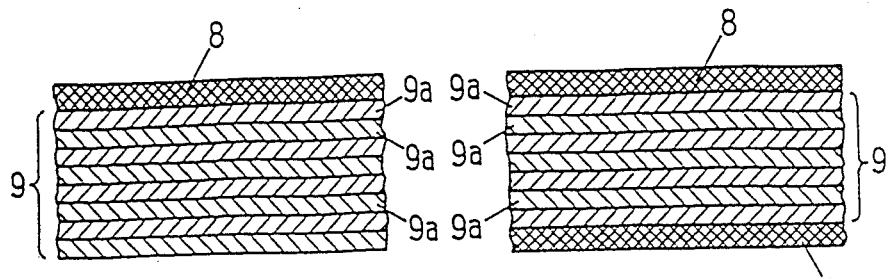
Fig. 4    Fig. 5
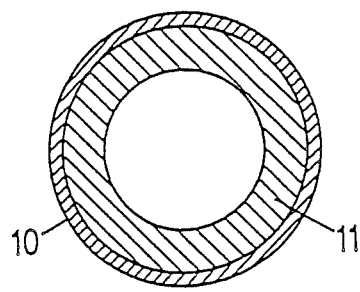
Fig. 6
Fig. 7

FIBER REINFORCED PLASTIC AND ITS REINFORCEMENT

FIELD OF THE INVENTION

The present invention relates to a fiber reinforced plastic, which is lightweight and has excellent impact absorption properties, and its reinforcement.

BACKGROUND OF THE INVENTION

Since fiber reinforced plastics using inorganic fibers as reinforcements are lightweight as well as are superior in tensile properties, compression properties and flexural properties, they have been utilized as structural materials in place of metallic materials in certain technical fields. Particularly, a fiber reinforced plastic using carbon fibers as its reinforcement has excellent lightweight properties in addition to the above properties and, therefore, it has been utilized as structural materials for aircraft as well as spacecraft such as artificial satellites and rockets, sports bicycles, wheelchairs, robots and the like.

However, a fiber reinforced plastic using carbon fiber as its reinforcement has a disadvantage that the plastic becomes brittle due to impact and, upon breakage, pieces thereof are scattered. The reason is that, in addition to extremely low elongation of carbon fibers, epoxy resin which is widely used as a matrix material of fiber reinforced plastics for structural materials is extremely brittle, while it is superior in heat resistance and chemical resistance.

In order to overcome such a disadvantage, from the viewpoint of reinforced fibers, improved carbon fibers having high strength and high elongation have been developed and, from the viewpoint of matrix resins, an improved epoxy resin having high elongation and maintaining its original physical properties has been developed. However, they have not yet fulfilled the requirements of the market.

Recently, in order to compensate for brittleness of carbon fibers by formation of a composite with other fibers, laminating of a reinforced resin layer using carbon fibers as the reinforcement and a reinforced resin layer using aramid fibers which have excellent impact resistance or ultra high molecular weight polyethylene fibers which have both high strength and high modulus as the reinforcement has been tried. Impact resistance of a fiber reinforced plastic composed of a reinforced resin layer using carbon fibers and a reinforced resin layer using aramid fibers is improved in comparison with that of a fiber reinforced plastic using carbon fibers alone as the reinforcement. On the other hand, in order to provide toughness required by the market thereto, it is necessary to considerably increase the amount of aramid fibers to be used. In this case, there are disadvantages that compression properties and flexural properties of the resulting fiber reinforced plastic are lowered and physical properties are deteriorated by water absorption under use conditions because water absorption of aramid fibers is as high as 3.5% under the standard conditions and, further, lightweight requirement can not be satisfied because the specific gravity of aramid fibers is 1.45, which is the highest among organic fibers.

On the other hand, a fiber reinforced plastic composed of a reinforced resin layer using carbon fibers and a reinforced resin layer using ultra high molecular weight polyethylene fibers has satisfactory lightweight properties, low water absorption and improved impact resistance because ultra high molecular weight polyethylene fibers are light and low in water absorption in comparison with aramid fibers and impact resistance is excellent. However, there is a disadvantage that delamination is liable to be caused by impact at the boundary between the reinforced resin layer of carbon fibers and that of ultra high molecular weight polyethylene fibers because of inferior adhesion to a matrix resin.

OBJECTS OF THE INVENTION

One object of the present invention is to provide a fiber reinforced plastic wherein impact resistance of a fiber reinforced plastic using inorganic fibers such as carbon fibers, glass fibers and the like is improved by formation of a composite with ultra high molecular weight polyethylene fibers and, at the same time, delamination of its layers is prevented.

Another object of the present invention is to provide a reinforcement suitable for producing the fiber reinforced plastic of the present invention.

These objects as well as other objects and advantages of the present invention will be apparent to those skilled in the art from the following description with reference to the accompanying drawings

BRIEF EXPLANATION OF THE DRAWINGS

FIGS. 4 to 6 are schematic cross sections of the fiber reinforced plastic according to the invention.

FIG. 7 is a schematic unit texture diagram of the surface of the mixed-woven or knitted fabric illustrating the definition of the "area" occupied by one kind of filaments.

SUMMARY OF THE INVENTION

According to the present invention, there is provided a reinforcement for a fiber reinforced plastic which is a mixed-woven or knitted fabric of two kinds of filaments, one kind of filaments thereof being an ultra high molecular weight polyethylene filament having tensile strength of not less than 20 g/denier and tensile modulus of not less than 500 g/denier, the ultra high molecular weight polyethylene filament occupying 60 to 90% of the total surface area of said fabric, and the filament other than the ultra high molecular weight polyethylene filament occupying 60 to 90% of the total back surface area of said fabric.

The present invention further provides a fiber reinforced plastic comprising a first reinforced resin layer reinforced with the above reinforcement and a matrix resin, and a second reinforced resin layer reinforced with an inorganic fiber and a matrix resin, the first reinforced resin layer being laminated on at least one surface of the second reinforced resin layer in such a manner that the back surface of the first reinforced resin layer faces to the second reinforced resin layer.

DETAILED EXPLANATION OF THE INVENTION

Among two kinds of filaments used in the present invention, one kind of filament is a ultra high molecular weight polyethylene filament having both high strength and high modulus. That is, the tensile strength is not less than 20 g/denier, preferably not less than 30 g/denier, more preferably 40 g/denier, and the tensile modulus is not less than 500 g/denier, preferably not less than 800 g/denier, more preferably not less than 1000 g/denier. Preferably, the viscosity-average molecular weight thereof is not less than 500,000. In addition, preferably, the fineness of the above ultra high molecular weight polyethylene filament is 0.2 to 20 denier, particularly, 0.5 to 10 denier.

The other filament may be that used as a conventional reinforcement for a fiber reinforced plastic. Examples thereof include filaments of carbon fibers, glass fibers, aromatic polyamide fibers, aromatic polyester fibers and polyvinyl alcohol fibers. Particularly, fibers such as carbon fibers, glass fibers and the like which are superior in adhesion to a matrix resin are preferred.

Figure 1:
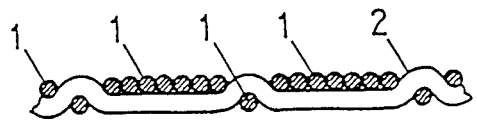
FIGS. 1 to 3 are schematic cross sections of the mixed-woven or knitted fabric according to the invention.
Figure 2:
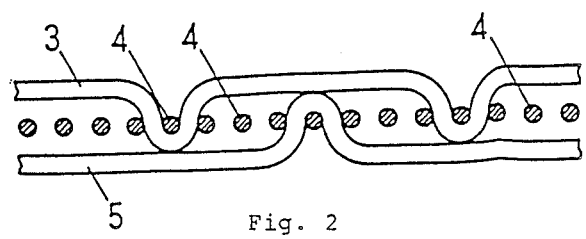
Figure 3:
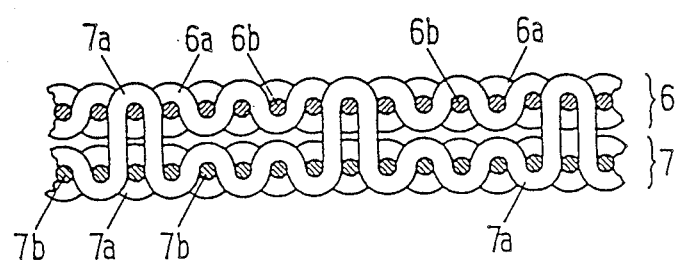

When mixed-weaving or knitting is carried out by using the above two filaments, the texture of the mixed woven or knitted fabric is selected so that the ultra high molecular weight polyethylene filament is abundantly appeared on the surface of the fabric and the other filament is abundantly appeared on the back surface. FIG. 1 illustrates an example of the fabric of the present invention, wherein eight-shaft satin is woven by using the above ultra high molecular weight polyethylene filament as the warp 1 and the other fiber material as the weft 2. The warp 1 and weft 2 are appeared on the surface in the proportion of 7:1 on the surface and the warp 1 and weft 2 are appeared on the back surface in the proportion of 1:7. Further, FIG. 2 illustrates an example of the warp double woven fabric of the present invention, wherein the ultra high molecular weight polyethylene filament is used as the surface warp 3 and weft 4, and the other filament is used as the back warp 5. The surface is textured by twill weave of the warp and the back surface is textured by twill weave of the weft. The surface is covered with the ultra high molecular weight polyethylene filament of the surface warp 3, and the back surface is covered with the other filament 5. FIG. 3 illustrates an example of the warp and weft double woven fabric, wherein the ultra high molecular weight polyethylene filament is used as the warp 6a and weft 6b of the surface fabric 6 to texture plain weave, and the other filament is used as the warp 7a and weft 7b of the backing fabric 7 to texture plain weave. A part of the back warp 7a is interlocked with the surface weft 6a to connect the surface fabric 6 with the backing fabric 7. The surface is covered with the ultra high molecular weight filament, and the back surface is covered with the other filament. The above examples illustrate the woven fabrics. In the case of the knitted fabric, the ultra high molecular weight polyethylene filament can be appeared on the surface and the other filament can be appeared on the back surface by plating or double knitting. The area occupied by the ultra high molecular weight polyethylene filament on the surface of the knitted or woven fabric is 60 to 90%, preferably 65 to 85%, particularly 65 to 80% of the total surface area. On the other hand, the area occupied by the other filament on the back surface of the woven or knitted fabric is 60 to 90%, preferably 65 to 85%, particularly 65 to 80% of the total back surface area.

When the area occupied by the ultra high molecular weight polyethylene filament on the surface of the fabric is less than 60%, the area occupied by the other filament on the back surface also becomes less than 60%, which results in lowering of adhesion of the back surface. This is not preferred.

Further, when the area occupied by the ultra high molecular weight polyethylene filament on the surface of the fabric exceeds 90%, the area occupied by the other filament also exceeds 90%. In this case, adhesion of the back surface is improved. However, the number of filaments which connect the surface of the mixed-woven or knitted fabric with the back surface thereof is decreased and, therefore, the connecting filaments are liable to be broken due to external force, that is, shear stress, which results in delamination at the boundary between the surface and the back surface. This is not preferred, either.

As the matrix resin used in the present invention, any resin which is set at a temperature of not higher than 145° C., or finally set by removal of a solvent can be used. Examples thereof include polyether polyurethane, polyester polyurethane, aliphatic hydrocarbon polymers, aliphatic hydrocarbon copolymers, unsaturated polyester resins, vinyl ester resins, epoxy resins, phenol resins, urethane acrylate resins and the like. In order to obtain the fiber reinforced plastic having the desired impact resistance, thermosetting resins having improved toughness, particularly, epoxy resins are preferred.

The above matrix resin is impregnated in the mixed-woven or knitted fabric composed of the above ultra high molecular weight polyethylene filament and the other filament, as well as an inorganic fiber layer composed of a non-woven fabric, filament or fabric of inorganic fibers, respectively. A first prepreg sheet is formed by the above mixed-woven or knitted fabric and a second prepreg sheet is formed by the inorganic fiber layer. Then, the above first prepreg sheet containing the mixed-woven or knitted fabric and the above second prepreg sheet containing the inorganic fiber layer are laminated to each other and thermoformed. Thereby, the above first and second prepreg sheets are set, respectively, and the both sheets adhere to each other to give the desired fiber reinforced plastic of the present invention having the first reinforced resin layer containing the above mixed-woven or knitted fabric and the second reinforced resin layer containing the above inorganic fiber layer.

The fiber reinforced plastic of FIG. 4 is composed of a first reinforced resin layer 8 containing the mixed-woven or knitted fabric and a second reinforced resin layer 9 containing plurality of the inorganic fiber layers. The second reinforced resin layer 9 is formed by laminating a plurality of the second prepreg sheets 9a, and the back surface of the first prepreg sheet, that is, the surface wherein the other filament 2, 5, 7a or 7b is abundantly appeared is laminated thereon. As the second prepreg sheet 9a, there can be used a non-woven fabric composed of inorganic fibers, a sheet wherein inorganic filaments are unidirectionally arranged or a fabric knitted with inorganic filament. When the sheet is made by arranging inorganic filaments, an orthogonal array can be obtained by changing the directions of the upper and lower layers.

FIG. 5 illustrates another embodiment of the plastic wherein the first reinforced resin layer 8 is formed on both upper and lower surfaces of the second reinforced resin layer 9. The above FIGS. 4 and 5 illustrate the fiber reinforced plastics in the form of sheet. On the other hand, FIG. 6 illustrates the fiber reinforced plastic obtained by thermoforming the first and second prepreg sheets in the form of a pipe. In FIG. 6, the symbol 10 is the first reinforced resin layer containing the mixed-woven or knitted fabric and the symbol 11 is the second reinforced resin layer containing plurality of the inorganic fiber layers. In this case, the cylindrical inner space of the second reinforced resin layer 11 can be filled with a certain material, for example, a foamed plastic material. Further, in FIG. 6, the second resin layer may form a solid core.

In the present invention, since at least one surface of the second reinforced resin layer 9 or 11, which contains inorganic fibers and is relatively brittle, is covered with the first reinforced resin layer which is superior in toughness and contains the ultra high molecular weight polyethylene filament 8 or 10, impact resistance is improved. Further, since the above ultra high molecular weight polyethylene filament is relatively lightweight and has low water adsorption, lightness of the second reinforced resin layer 9 or 11 is not impaired and deterioration with time is not caused. In addition, since the ultra high molecular weight polyethylene filament contained in the above first reinforced resin layer 8 or 10 is mixed-woven or knitted with the other filament as well as the other filament is superior in adhesion to the resin and faces to the surface of the second reinforced resin layer 9 or 11, the first reinforced resin layer 8 or 10 is not delaminated at the boundary of the second reinforced resin layer 9 or 11.

However, when the proportion of the area occupied by the ultra high molecular weight polyethylene filament on the surface of the mixed-woven or knitted fabric is less than 60%, excellent impact resistance of the above ultra high molecular weight polyethylene filament is not sufficiently elicited and, when the proportion of the area occupied by the other filament on the back surface of the mixed-woven or knitted fabric is less than 60%, adhesion between the fabric and the matrix resin is decreased and, therefore, impact delamination is liable to be caused at the boundary surface on the second reinforced resin layer containing the inorganic fiber layer. Further, when the inorganic filament such as carbon fiber filament, glass fiber filament or the like is used as the above other filament, adhesion to the matrix resin is further improved. Furthermore, when the inorganic fiber layer contained in the second reinforced resin layer 9 or 11 is formed by carbon fibers, the properties such as lightness, strength and high modulus as the fiber reinforced plastic are further improved.

The "area" occupied by one kind of filament on the surface or back surface of the fabric is defined as follows:

The area occupied by one kind of filaments is calculated based on a unit texture of a fabric mixed-woven or knitted with two kinds of filaments. For example, in the case of the fabric having a unit texture composed of 9 textures or stitches of two kinds of filaments (1) and (2) as shown by FIG. 7, the area occupied by the filament (1) is defined by the following equation:

$$6/9 \times 100 = ca. 67 \ (\%)$$

The following Examples and Comparative Examples further illustrate the present invention in detail but are not to be construed to limit the scope thereof.

EXAMPLE 1

By using a ultra high molecular weight polyethylene filament (manufactured by Dyneema V.O.F.; Dyneema SK-60) having the tensile strength of 35 g/denier, tensile modulus of 1350 g/denier, viscosity-average molecular weight of 1,500,000 and fineness of 300 denier as the warp and, as the weft of the other filament carbon fiber filament (manufactured by Toho Rayon Co., Ltd.; Besfite HTA-7W-1000) having fineness of 600 denier, there was obtained a mixed-woven fabric having the warp density of 16.5 filaments/cm (42 filaments/inch), weft density of 16.5 filaments/cm (42 filaments/inch), weight of 170 g/cm$^2$, texture of eight-shaft satin and area occupied by the ultra high molecular weight polyethylene filament of 87.5%. The resulting mixed-woven fabric was impregnated with epoxy resin to obtain a first prepreg sheet. On the other hand, by using as the warp and weft of inorganic fibers carbon fiber filament having the fineness of 600 denier, there was obtained a plain woven fabric having the respective warp and weft densities of 7.1 filaments/cm (18 filaments/inch) and weight of 95 g/m$^2$. The resulting fabric was then impregnated with epoxy resin to obtain a second prepreg sheet. 26 Second prepreg sheets containing plain woven fabrics of carbon fiber filament obtained in the above were laminated to each other, and the first prepreg sheet containing the above mixed-woven fabric was laminated thereon so that the surface wherein the weft (carbon fiber filament) thereof were abundantly appeared was faced downward. Then, the resulting laminate was placed in a heat press machine and press forming was carried out at 120° C. for 2 hours. The resulting fiber reinforced plastic in the form of a plate (Example 1) had thickness of 2.5 mm and fiber content (Vf) of 60%.

EXAMPLE 2

By using the above high molecular weight polyethylene filament of Example 1 as the warp and as the weft of the other filament glass fiber filament of 75 denier (manufactured by Fuji Glass Fiber Co., Ltd.), there was obtained an eight-shaft satin mixed-woven fabric having the respective warp and weft densities of 16.5 filaments/cm (42 filaments/inch), weight of 163 g/cm$^2$ and area occupied by the ultra high molecular weight polyethylene filament of 87.5%. The resulting mixed-woven fabric was impregnated with epoxy resin to obtain a first prepreg sheet. On the other hand, 26 second prepreg sheets of Example 1 were laminated and then the first prepreg sheet was laminated on the most upper layer thereof so that the surface wherein the warp (glass fiber filament) was abundantly appeared was faced to the second prepreg sheet layer. Then, press forming was carried out at 120° C. for 2 hours by using a heat press machine. The resulting fiber reinforced plastic in the form of a plate (Example 2) had thickness of 2.5 mm and fiber content (Vf) of 60%.

COMPARATIVE EXAMPLE 1

28 Second prepreg sheets of Example 1 containing carbon fiber filaments were laminated and then thermoforming was carried out at 120° C. for 2 hours by using a thermoforming machine to obtain a fiber reinforced plastic of Comparative Example 1. Thickness was 2.5 mm and fiber content (Vf) was 60%.

COMPARATIVE EXAMPLE 2

27 second prepreg sheets of the above Example 1 were laminated and then the prepreg of the plain woven fabric wherein the high molecular weight polyethylene filament of Example 1 was used as both warp and weft (area occupied by the ultra high molecular weight polyethylene filament was 50%) was laminated on the most upper layer thereof. The respective warp and weft densities of the above woven fabric was 8.7 filaments/cm (22 filaments/inch) and the weight was 58 g/m$^2$. Then, according to the same manner as described in Example 1, the above laminate was subjected to a press forming to obtain a fiber reinforced plastic of Comparative Example 2 which had thickness of 2.5 mm and fiber content (Vf) of 60%.

Square specimens having 15 cm in one side length were cut out from the four sheets of the fiber reinforced plastic plates of Examples 1 and 2 and Comparative Examples 1 and 2, respectively. The specimens were subjected to impact test by using a drop impact test machine (apex of insert: spherical surface having 2 inch in diameter, load: 2.5 kg, height of drop: 90 cm, opening diameter for specimen: 12 cm × 12 cm). Then, the breakage and degree of delamination of each specimen were compared.

The results are shown in Table 1.

In Table 1, delamination area was evaluated by a supersonic flaw detector and breakage was evaluated whether the second reinforced resin layer containing carbon fiber layer was broken (+) or not (−).

TABLE 1

|  | Example | | Comparative Example | |
| --- | --- | --- | --- | --- |
|  | 1 | 2 | 1 | 2 |
| Delamination area (cm$^2$) | 7 | 5 | 4 | 16 |
| Breakage | − | − | + | − |

As seen from Table 1, in the plastics of the present invention (Examples 1 and 2), the delamination area of is small and breakage of the second reinforced resin layer containing carbon fiber layer is not observed. To the contrary, in Comparative Example 1 wherein the first reinforced resin layer of the ultra high molecular weight polyethylene filament is not used, delamination area is small, but breakage of the second reinforced resin layer is observed because the fiber reinforced plastic is formed by the second reinforced resin layer containing carbon fiber alone. Further, in Comparative Example 2 wherein the upper most layer is provided with the reinforced resin layer of a fabric composed of the ultra high molecular weight polyethylene filament alone, breakage is not observed, but delamination area is very large.

As described hereinabove, in the mixed-woven or knitted fabric of the present invention, the ultra high molecular weight polyethylene filament having toughness is abundantly appeared on one surface and the other filament is abundantly appeared on the other surface. Accordingly, by laminating a first reinforced resin layer reinforced with the woven or knitted fabric on at least one surface of a second reinforced resin layer reinforced with inorganic fibers, low impact resistance of a second resin layer is compensated. Thereby, impact resistance of the fiber reinforced plastic is improved and delamination resistance of the boundary surface between the first reinforced resin layer and the second reinforced resin layer is improved.

What is claimed is:

1. A fiber reinforced plastic comprising:
    (1) a first reinforced resin layer reinforced with a reinforcement, which comprises a mixed-woven or knitted fabric of two kinds of filaments, one kind of filament thereof being an ultra high molecular weight polyethylene filament having tensile strength of not less than 20 g/denier and tensile modulus of not less than 500 g/denier, the ultra high molecular weight polyethylene filament material occupying 60 to 90% of the total surface area of said fabric, and the other filament being an inorganic fiber occupying 60 to 90% of the total back surface area of said fabric, and a matrix resin, and
    (2) a second reinforced resin layer reinforced with an inorganic fiber and a matrix resin,
    said first reinforced resin layer being laminated on at least one surface of said second reinforced resin layer in such a manner that the back surface of said first reinforced resin layer faces to said second reinforced resin layer.

2. The fiber reinforced plastic according to claim 1, wherein the matrix resin is a rein which can be set at not more than 145° C. or set by removal of a solvent.

3. The fiber reinforced plastic according to claim 1, wherein the matrix is selected from the group consisting of polyether polyurethane, polyester polyurethane, aliphatic hydrocarbon polymer, aliphatic hydrocarbon copolymer, unsaturated polyester resins, vinyl ester resins, epoxy resins, phenol resins and urethane acrylate resins.

4. The fiber reinforced plastic according to claim 1, wherein the matrix resin is epoxy resin.

5. The fiber reinforced plastic according to claim 1 which has a cylindrical cross section.

6. The fiber reinforced plastic according to claim 1, wherein the inorganic fiber of the first reinforced resin layer is carbon fiber or glass fiber.

7. The fiber reinforced plastic according to claim 6, wherein the inorganic fiber of the second reinforced resin layer is carbon fiber.

* * * * *